United States Patent Office 3,321,486
Patented May 23, 1967

3,321,486
SUBSTITUTED 4-OXO-4,5,6,7-TETRA-
HYDROINDOLES
William Alan Remers, Suffern, N.Y., and Martin Joseph
Weiss, Oradell, N.J., assignors to American Cyanamid
Company, Stamford, Conn., a corporation of Maine
No Drawing. Filed Feb. 24, 1965, Ser. No. 435,073
9 Claims. (Cl. 260—326.16)

This invention relates to new organic compounds. More particularly, it relates to substituted 4-oxygenated tetrahydroindoles and methods of preparing the same.

The novel tetrahydroindoles may be illustrated by the following formula:

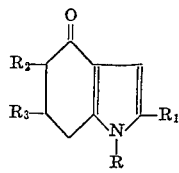

wherein R is selected from the group consisting of lower alkyl and mononuclear ar(lower)alkyl; $R_1$ is selected from the group consisting of hydrogen and lower alkyl; $R_2$ is selected from the group consisting of cyano, formyl and α-hydroxy(lower)alkylene and $R_3$ is selected from the group consisting of hydrogen and lower alkyl.

The compounds of this invention are, in general, white crystalline compounds with relatively low melting points, insoluble in water and soluble in the usual organic solvents.

The present compounds can be prepared for example by the methods illustrated by the following equations:

FLOWSHEET A

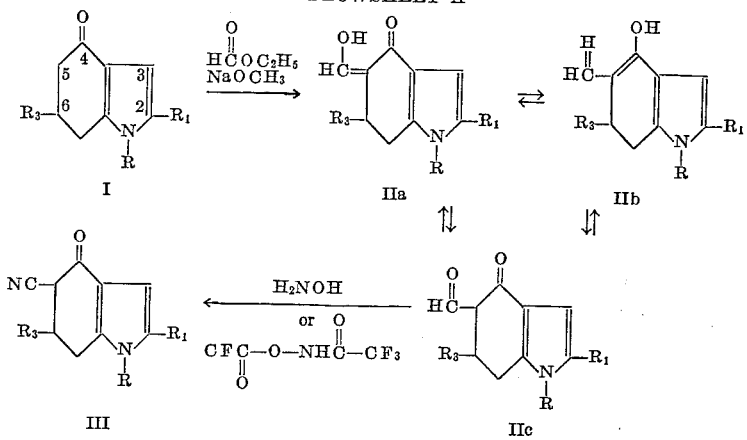

wherein R, $R_1$ and $R_3$ are as hereinbefore defined.

As shown above, for example, a 5-unsubstituted-4-keto-tetrahydroindole such as compound I reacted with an ester of formic acid such as, for example, ethylformate and a base such as sodium methoxide gives the corresponding 5-hydroxymethylene derivative (IIa). That (IIa) is in rapid tautomeric equilibrium with (IIb) is demonstrated by the position (2.20τ) in the n.m.r. spectrum of the proton bound to the carbon atom introduced at the 5-position [see J. Am. Chem. Soc., 85, 1696 (1963)]. Tautomer (IIc) is obtained by recrystallizing the mixture of (IIa) and (IIb) from a polar solvent such as methanol. The presence of a small amount of (IIc) in equilibrium with (IIa) and (IIb) in solution is demonstrated by a small peak at −0.08γ (aldehydic proton of IIc) in the n.m.r. spectrum. In the specification and claims hereinafter the recitation of particular compounds are intended to include the tautomeric forms thereof as illustrated above. Treatment of a 5-hydroxymethylene-4-ketotetrahydroindole such as (IIa), (IIb) or (IIc) with hydroxylamine or a derivative such as O,N-bis(trifluoroacetyl)hydroxylamine produces the corresponding 5-cyano-4-ketotetrahydroindole (III).

The present compounds are useful intermediates in the preparation of substituted pyrroloindazoles described and claimed by Francis McEvoy, James M. Smith, Jr., and Duff S. Allen, Jr., in an application Ser. No. 435,028 filed Feb. 24, 1965.

The conversion of compounds represented by structures II and III in flowsheet A to pyrroloindazoles is illustrated in flowsheet B and C, respectively.

FLOWSHEET B

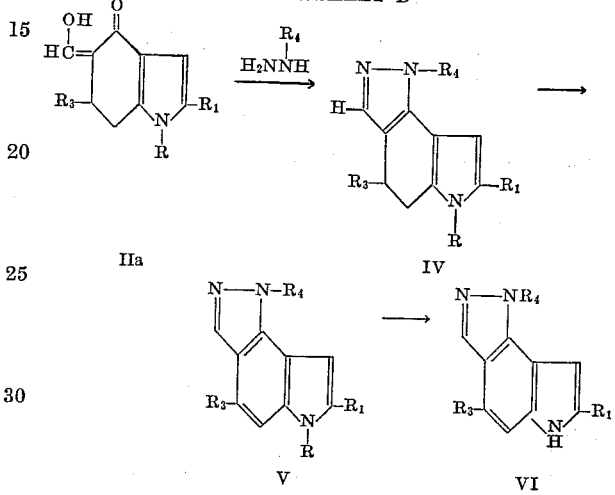

in which R, $R_1$ and $R_3$ are as hereinbefore defined and $R_4$ is hydrogen, lower alkyl or mononuclear aryl.

FLOWSHEET C

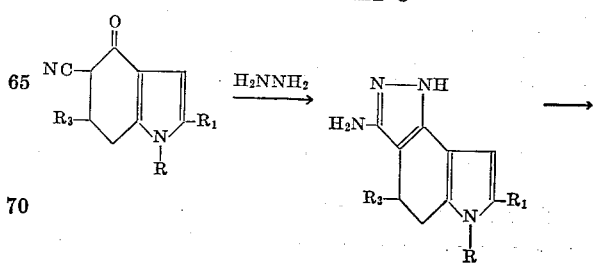

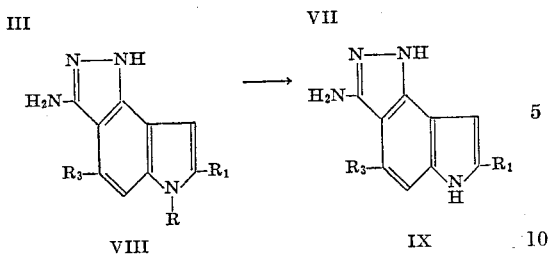

in which R, $R_1$ and $R_3$ are as hereinbefore defined.

Furthermore, compounds of this invention are useful as intermediates for the preparation of the anti-bacterial compounds described and claimed by co-workers G. R. Allen et al. in application Ser. No. 388,312 filed Aug. 7, 1964, now U.S. Patent No. 3,265,698.

The conversion of a compound of formula type II in flowsheet A to 1-ethyl-3-hydroxymethyl-2,5,6-trimethyl-4,7-dioxoindole methylcarbamate is illustrated in flowsheet D as follows:

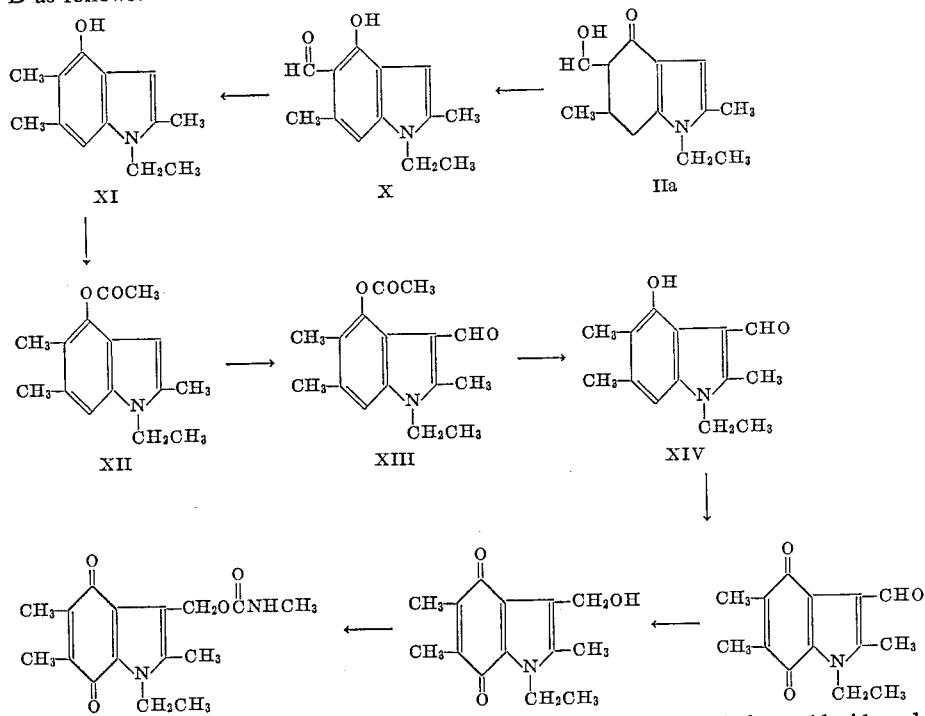

The following examples illustrate in greater particularity the preparation of representative tetrahydroindoles of the present invention.

EXAMPLE 1

*Preparation of 1-ethyl-2-methyl-4-oxo-4,5,6,7-tetrahydroindole (see I)*

A mixture of 33 g. of 2-acetonyl-1,3-cyclohexanedione (prepared as described in Ann., 655, 20 [1962]) 20 g. of anhydrous ethylamine, and 135 ml. of methanol is heated in a steel bomb for 12 hours at 150° C. The cooled mixture is concentrated and the residue is treated with water and methylene chloride. After the organic layer is washed two times with 5% sodium hydroxide solution, it is dried and concentrated and the residue is crystallized from cyclohexane. This procedure gives 18.8 g. of white crystals, melting point 74–75° C.

EXAMPLE 2

*Preparation of 2,6-dimethyl-1-ethyl-4-oxo-4,5,6,7-tetrahydroindole (see I)*

In the manner described in Example 1 treatment of 2-acetonyl-5-methyl-1,3-cyclohexanedione (prepared as described in Ann., 655, 20 [1962]) with ethylamine gives white needles, melting point 77–79° C.

EXAMPLE 3

*Preparation of 1-ethyl-5-hydroxymethylene-2-methyl-4-oxo-4,5,6,7-tetrahydroindole (and Tautomers IIa, b and c)*

An ice-cooled suspension of 1.08 g. of sodium methoxide in 10 ml. of dry benzene, under nitrogen, is treated with a solution of 1.48 g. of ethyl formate in 5 ml. of benzene and a solution of 885 mg. of 1-ethyl-2-methyl-4-oxo-4,5,6,7-tetrahydroindole (Example 1) in 10 ml. of benzene. The mixture is stirred at room temperature overnight, then cooled in an ice bath and treated with 20 ml. of 5% sodium hydroxide solution. The benzene layer is extracted with an additional 10 ml. of 5% sodium hydroxide solution and the combined alkaline extracts are cooled in an ice bath, layered with 20 ml. of benzene and acidified with 6 N hydrochloric acid. A pale yellow solid separates. This solid (230 mg.) has $\lambda_{max}$ 6.05, 6.15$\mu$, indicating that it is in a dicarbonyl form (see IIc).

A methylene chloride solution of this solid on concentration gives the monocarbonyl tautomeric forms (see IIa, IIb) ($\lambda_{max}$ 6.03$\mu$).

Concentration of the benzene layer from which the above yellow solid has separated gives a pale yellow oil that crystallizes on standing, producing an additional 440 mg. of monocarbonyl tautomeric forms, melting point 65–70° C. Recrystallization from methanol gives white prisms melting point 82–90° C.; $\lambda_{max}$ 6.05, 6.15$\mu$ (dicarbonyl form); 265 ($\epsilon$7,700), 281 ($\epsilon$7,800), 329 ($\epsilon$10,600) m$\mu$; n.m.r.

$$-0.08 \left( 5\% \ \overset{O}{\underset{}{H\overset{\|}{C}}}-CH-\overset{O}{\underset{}{\overset{\|}{C}}}- \right)$$

$$\left( 95\% \ \overset{OH}{\underset{}{H\overset{|}{C}}}=C-\overset{O}{\underset{}{\overset{\|}{C}}}- \rightleftarrows \overset{O}{\underset{}{H\overset{\|}{C}}}-C=\overset{OH}{\underset{}{\overset{|}{C}}}- \right)$$

EXAMPLE 4

*Preparation of 2,6-dimethyl-1-ethyl-5-hydroxymethylene-4-oxo-4,5,6,7-tetrahydroindole and tautomeric forms (see IIa, b, c)*

Following the procedure described in Example 3 and treating 2,6-dimethyl-1-ethyl-4-oxo - 4,5,6,7 - tetrahydroindole (Example 2) with ethyl formate gives greyish needles of the desired product, melting point 71–74°.

EXAMPLE 5

*Preparation of 1-benzyl-5-hydroxymethylene-2-methyl-4-oxo-4,5,6,7-tetrahydroindole and tautomeric forms (see IIa, b, c)*

In the manner described in Example 3 treatment of 1-benzyl-2-methyl-4-oxo-4,5,6,7-tetrahydroindole (prepared as described in Ber., 96, 1470 [1963]) with methyl formate gives yellow plates, melting point 89–91° C.

EXAMPLE 6

*Preparation of 5-cyano-1-ethyl-2-methyl-4-oxo-4,5,6,7-tetrahydroindole (see III)*

A mixture of 1.03 g. of 1-ethyl-5-hydroxymethylene-2-methyl-4-oxo - 4,5,6,7 - tetrahydroindole (Example 3), 1.13 g. of O,N-bis(trifluoroacetyl)hydroxylamine, 0.79 g. of pyridine and 10 ml. of benzene is heated at reflux temperature for 20 minutes, then left at room temperature for 18 hours. It is treated with water and the benzene phase is washed with water and sodium bicarbonate solution, dried and concentrated to a brown solid. Two crystallizations of this solid from acetone-hexane affords 360 mg. of white prisms, melting point 141–145° C. $\lambda_{max.}$ 4.4, 6.05μ; 255 (11,000), 291 (7,300) mμ.

EXAMPLE 7

*Preparation of 5-cyano-2,6-dimethyl-1-ethyl-4-oxo-4,5,6,7-tetrahydroindole (see III)*

In the manner described in Example 6, treatment of 2,6-dimethyl - 1 - ethyl-5-hydroxymethylene-4-oxo-4,5,6,7-tetrahydroindole (Example 4) with O,N-bis(trifluoroacetyl)hydroxylamine gives white solid, melting point 140–143° C.

EXAMPLE 8

*Preparation of 1-benzyl-5-cyano-2-methyl-4-oxo-4,5,6,7-tetrahydroindole (see III)*

A solution of 500 mg. of 1-benzyl-5-hydroxymethylene-2-methyl-4-oxo-4,5,6,7-tetrahydroindole (Example 5) and 143 mg. of hydroxylamine hydrochloride in 20 ml. of ethanol is heated at reflux temperature for 18 hours, diluted with water and evaporated under reduced pressure until the alcohol is removed. A methylene chloride extract of the residual aqueous solution is washed with saline, dried and concentrated. Crystallization of the residue from acetone-hexane gives white crystals, melting point 98–99° C.

EXAMPLE 9

*Preparation of 1-benzyl-4-oxo-4,5,6,7-tetrahydroindole (see I)*

A suspension of 4-oxo-4,5,6,7-tetrahydroindole (Ann., 655, 20 (1962)) in dry benzene is added to a suspension of freshly prepared potassium tertiary butoxide in dry benzene. The mixture is refluxed for two hours and then cooled to room temperature. Benzylchloride is added and the reaction mixture is refluxed for 17 hours. The mixture is cooled and added to water. The mixture is acidified with concentrated hydrochloric acid and extracted with methylene chloride. The organic layer is washed with brine, dried and concentrated under reduced pressure to give a yellow oil. The oil is extracted with boiling water several times and then the oil is dissolved in methylene chloride, dried and concentrated under reduced pressure, the residual oil crystallizes on standing and is recrystallized from methylene chloride-hexane to give a crystalline solid, melting point 80–81.5° C.

EXAMPLE 10

*Preparation of 1-benzyl-5-hydroxymethylene-4-oxo-4,5,6,7-tetrahydroindole and tautomeric forms (see IIa, b, c)*

A mixture of 1-benzyl-4-oxo-4,5,6,7-tetrahydroindole (Example 9) dissolved in dry benzene and freshly distilled ethyl formate dissolved in dry benzene is added dropwise in a nitrogen atmosphere at 0° to a suspension of fresh sodium methoxide in dry benzene. A gum precipitates from the reaction mixture at room temperature and dissolved completely at reflux temperature. A solid precipitates from the solution after 1 hour at reflux. The mixture is refluxed for a total of 4 hours, cooled to 0° and then extracted with water. All the solid dissolves the aqueous extract has a pH of 10 is cooled with ice, layered with methylene chloride and acidified with concentrated hydrochloric acid to pH 1. The organic extract is washed with brine, dried and concentrated under reduced pressure to give a yellow substance which gives a positive ferric chloride test.

EXAMPLE 11

*Preparation of 1,6-dihydro-7-methylpyrrolo[2,3-g] indazole (see VI)*

A solution of 2.5 g. of 1-benzyl-5-hydroxymethylene-2-methyl-4-oxo-4,5,6,7-tetrahydroindole (Example 5) and 0.50 ml. of hydrazine hydrate in 50 ml. of ethanol is heated at refluxing temperatures for ninety minutes. Water (20 ml.) is added to the solution which is then evaporated under reduced pressure at a bath temperature of 45°–50° C. until crystals begin to form. The solution is chilled in an ice bath for thirty minutes and the product is collected as 2.41 g. (98%) of tan crystals, melting point 86°–92° C. Recrystallization from methanol produces an alcoholate (melting point 97–104° C. gas evolution with previous shrinking).

A mixture of 500 mg. of 6-benzyl-2,4,5,6-tetrahydro-7-methylpyrrolo[2,3-g]indazole (see IV) and 150 mg. of 10% palladium-on-carbon in 10 ml. of cumene is stirred and heated at reflux for two hours. The mixture is filtered through diatomaceous earth while still hot, rinsing with a little benzene. The cooled filtrate deposits 361 mg. (73%) of white needles, melting point 185–186° C. Two recrystallizations from acetone-hexane raises the melting point to 186–188° C.

Approximately 500 ml. of liquid ammonia is stirred in a Dry Ice-acetone bath and small chips of sodium are added until the blue color first persists. In portions, 2.0 g. of sodium is added and the solution is stirred for 10 minutes. The 4.0 g. of 6-benzyl-1,6-dihydro-7-methylpyrrolo[2,3-g]indazole (see V) is added as rapidly as possible and the solution is stirred for 2 minutes. Ammonium chloride is added portionwise until the blue color disappears (approximately 4 g. of ammonium chloride is used). The solution is stirred in a 25° C. water bath until the ammonia evaporates. To the residue is added 280 ml. of water and the mixture is acidified with 10% acetic acid (about 40 ml.). The residual solid is dissolved in 200 ml. of ethyl acetate. The aqueous solution is extracted twice more with 100 ml. portions of ethyl acetate. The organic extract is washed with saline and sodium bicarbonate solutions, dried with sodium sulfate and evaporated under reduced pressure to a dark green glass. A solution of the glass in 30 ml. of acetone and 150 ml. of methylene chloride is stirred with 32 g. of synthetic magnesium silicate for 5 minutes. The mixture is filtered through an 8 g. pad of synthetic magnesium silicate, washing the three 80 ml. portions of 10% acetone-methylene chloride. The filtrate is washed and evaporated to dryness under reduced pressure leaving a white solid residue. Crystallization from acetone-hexane gives 1.72 g. of white powder, melting point 215–220° C. A second crop of material weighing 368 mg. (melting point 213–215° C.) is obtained by concentration of the mother liquors raising the yield to 2.09 g. (80%).

EXAMPLE 12

*Preparation of 1,6-dihydro-1,7-dimethylpyrrolo[2,3-g]-indazole (see VI)*

A solution of 13.36 g. of 1-benzyl-5-formyl-4-oxo-2- methyl-4,5,6,7-tetrahydroindole (Example 5) and 3.3 ml. of methylhydrazine in 200 ml. of absolute ethanol is heated at reflux for 90 minutes, then diluted with 300 ml. of water and extracted with methylene chloride. The extract is dried with magnesium sulfate and evaporated to dryness under reduced pressure. The residue is dissolved in 250 ml. of 5% acetone-methylene chloride and stirred with 50 g. synthetic magnesium silicate. The mixture is filtered and the filter cake washed with three 80 ml. portions of 5% acetone-methylene chloride. The organic solution is evaporated to dryness under reduced pressure. The residual gum is dissolved in 100 ml. of ether and petroleum ether (30–60° C.) is added to turbidity affording 7.34 g. of white crystals, melting point 95–97° C.

A stirred solution of 7.34 g. of 6-benzyl-1,4,5,6-tetrahydro-1,7-dimethylpyrrolo[2,3-g]indazole (see IV) in 125 ml. of cumene and 1.25 g. of 10% palladium-on-charcoal is heated at reflux for 2 hours. The mixture is filtered through diatomaceous earth and the filtrate evaporated under reduced pressure. The residual gummy solid is dissolved in methylene chloride and placed on a chromatography column containing 700 g. of synthetic magnesium silicate wet with methylene chloride. The eluates are evaporated and the residue crystallized from methylene chloride-petroleum ether (20–60°) affording 4.13 g. of white prisms, melting point 114–116° C.

Approximately 250 ml. of liquid ammonia is stirred in a Dry Ice-acetone bath and small chips of sodium are added until the blue color first persists. In portions, 2.0 g. of sodium is added and the solution is stirred for 10 minutes. The 4.1 g. of 6-benzyl-1,6-dihydro-1,7-dimethylpyrrolo[2,3-g]indazole (see V) is added as rapidly as possible and the solution is stirred for 6 minutes. Ammonium chloride is added portionwise until the blue color disappears. The solution is stirred in a 25° C. water bath until the ammonia evaporates. To the residue is added 200 ml. of water and the insoluble material is collected as 2.56 g. of white solid melting point 180–190° C. The crude material is dissolved in 250 ml. of 2% acetone-methylene chloride and stirred with 100 g. of synthetic magnesium silicate. The mixture is filtered and the filter cake washed with four 125 ml. portions of 2% acetone-methylene chloride. The filtrate is evaporated under reduced pressure leaving white solid residue weighing 2.45 g. Crystallization of this material from acetone-hexane affords 1.25 g. of white powder, melting point 209–214° C.

EXAMPLE 13

*Preparation of 3-amino-1,6-dihydro-7-methylpyrrolo [2,3-g]indazole (see IX)*

To a solution of 1.02 g. of 1-benzyl-5-cyano-2-methyl-4-oxo-4,5,6,7-tetrahydroindole (Example 8) in 25 ml. of benzene is added 0.278 ml. of hydrazine hydrate and 0.43 ml. of glacial acetic acid. The solution is heated under reflux for 18 hours, cooled and 20 ml. of 6 N hydrochloric acid is added. The insoluble gum thus formed is separated and stirred with 20 ml. of methylene chloride. The resultant solid is collected and crystallized from ethanol-hexane affording white crystals, melting point 241–244° C., of hydrochloride. The free base is obtained by dissolving the above hydrochloride in methanol, diluting with water and making the solution alkaline with ammonium hydroxide affording white crystals, melting point 102°–110° C.

To a solution of 100 mg. of 3-amino-6-benzyl-1,4,5,6-tetrahydropyrrolo[2,3-g]indazole hydrochloride (see VII) in 15 ml. of absolute ethanol is added 100 mg. of 10% palladium-on-carbon. The mixture is stirred and heated at reflux in an argon atmosphere for 40 hours, then filtered and evaporated under reduced pressure. The residual gum is crystallized from ethanol-heptane affording 48 mg. of 3-amino-6-benzyl-1,6-dihydro-7-methylpyrrolo[2,3-g]indazole hydrochloride (see VIII), melting point 275–282° C.

Small pieces of sodium are added to 150 ml. of liquid ammonia stirred in an acetone-Dry Ice bath until a blue color persists, then 0.500 g. of sodium is added portionwise. The mixture is stirred for 5 minutes and 1.20 g. of 3-amino-6-benzyl-1,6-dihydro-7-methyl pyrrolo-[2,3-g] indazole is added. The mixture is stirred for 5 minutes and ammonium chloride is added portionwise until the blue color is discharged. The ammonia is evaporated and the residue is triturated with water. The residue is dissolved in methylene chloride and chromatographed on silica gel to give 0.080 g. of a crystalline product.

EXAMPLE 14

*Preparation of 2,6-dimethyl-1-ethyl-4-hydroxy-5-indolecarboxaldehyde (X)*

To a solution of 4.51 g. of 2,6-dimethyl-1-ethyl-5-hydroxymethylene-4-oxo - 4,5,6,7 - tetrahydroindole (Example 4) in 30 ml. of dioxane is added a solution of 4.54 g. of dichlorodicyanobenzoquinone in 30 ml. of dioxane. After one hour the mixture is filtered and the filtrate is concentrated. Recrystallization of the residue from hexane gives 2.28 g. of yellow rods, melting point 129–130.5° C.

EXAMPLE 15

*Preparation of 1-ethyl-4-hydroxy-2,5,6-trimethylindole (XI)*

A solution of 1.09 g. of 1-ethyl-4-hydroxy-2,6-dimethyl-5-indolecarboxaldehyde (Example 14) in ethanol is treated with 1.0 g. of 10% palladium-on-carbon and shaken with hydrogen in a Parr apparatus. The mixture is filtered and the filtrate is concentrated to give a yellow oil that crystallizes from hexane, affording 412 mg. of tan solid, melting point 98–102° C.

EXAMPLE 16

*Preparation of 4-acetoxy-1-ethyl-2,5,6-trimethylindole (XII)*

Treatment of a solution of 4.0 g. of 1-ethyl-4-hydroxy-2,5,6-trimethylindole (Example 15) in 75 ml. of water containing 1.35 g. of sodium hydroxide with 3.4 g. of acetic anhydride and 3.0 g. of sodium acetate at room temperature for 20 minutes gives pale yellow crystals, melting point 113–114.5° C.

EXAMPLE 17

*Preparation of 4-acetoxy-1-ethyl-2,5,6-trimethyl-3-indolecarboxaldehyde (XIII)*

Treatment of a solution of 3.20 g. of 4-acetoxy-1-ethyl-2,5,6-trimethylindole (Example 16) in 15 ml. of N,N-dimethylformamide with an ice-cooled mixture of 2.0 g. of phosphorous oxychloride and 15 ml. of N,N-dimethylformamide at 5° C. for 90 minutes, followed by treatment with aqueous sodium carbonate affords yellow needles, melting point 165°–168° C.

EXAMPLE 18

*Preparation of 1-ethyl-4-hydroxy-2,5,6-trimethyl-3-indolecarboxaldehyde (XIV)*

Warming a mixture of 3.14 g. of 4-acetoxy-1-ethyl-2,5,6-trimethyl-3-indolecarboxaldehyde (Example 17) 200 ml. of methanol and 60 ml. of 5% sodium hydroxide solution until a clear solution is obtained affords yellow needles, melting point 162–163.5° C.

EXAMPLE 19

*Preparation of 1-ethyl-2,5,6-trimethyl-4,7-dioxo-3-indolecarboxaldehyde (XV)*

Addition of a hot solution of 375 mg. of 1-ethyl-4-hydroxy-2,5,6 - trimethyl-3-indolecarboxaldehyde (Example 18) in 50 ml. of acetone with a solution of 3.96 g. of potassium nitrosodisulfonate in 360 ml. of M/18 potassium dihydrogen phosphate gives orange needles, melting point 125–127° C.

EXAMPLE 20

*Preparation of 1-ethyl-3-hydroxymethyl-2,5,6-trimethyl-4,7-dioxoindole (XVI)*

A suspension of 500 mg. of 1-ethyl-2,5,6-trimethyl-4,7-dioxo-3-indolecarboxaldehyde (Example 19) in 150 ml. of methanol, under nitrogen, is heated to reflux temperature and treated with 500 mg. of sodium borohydride. Boiling is continued for 3 minutes, and the solution is then stirred at room temperature for 1 hour. Acetone (5 ml.) is added followed by 5 ml. of a 1 N ferric chloride in 0.1 N hydrochloric acid solution. This procedure affords red-orange solid; λ max 6.14μ; 225, 274, 349 mμ.

EXAMPLE 21

*Preparation of 1-ethyl-3-hydroxymethyl-2,5,6-trimethyl-4,7-dioxoindole methylcarbamate (XVII)*

Treatment of 1-ethyl-3-hydroxymethyl-2,5,6-trimethyl-4,7-dioxoindole (Example 20) with excess methylisocyanate at reflux temperature for 16 hours gives orange solid, melting point 175°–178° C.

We claim:

1. A tetrahydroindole of the formula:

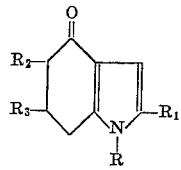

wherein R is selected from the group consisting of lower alkyl and benzyl; $R_1$ is selected from the group consisting of hydrogen and lower alkyl; $R_2$ is selected from the group consisting of cyano, formyl and α-hydroxy(lower)alkylene and $R_3$ is selected from the group consisting of hydrogen and lower alkyl.

2. A 1,2-dilower alkyl-5-α-hydroxy lower alkylene-4-oxo-4,5,6,7-tetrahydroindole.

3. The compound 1-ethyl-5-hydroxymethylene-2-methyl-4-oxo-4,5,6,7-tetrahydroindole.

4. The compound 2,6-dimethyl-1-ethyl-5-hydroxymethylene-4-oxo-4,5,6,7-tetrahydroindole.

5. The compound 1-benzyl-5-hydroxymethylene-2-methyl-4-oxo-4,5,6,7-tetrahydroindole.

6. The compound 5-cyano-1-ethyl-2-methyl-4-oxo-4,5,6,7-tetrahydroindole.

7. The compound 5-cyano-2,6-dimethyl-1-ethyl-4-oxo-4,5,6,7-tetrahydroindole.

8. The compound 1-benzyl-5-cyano-2-methyl-4-oxo-4,5,6,7-tetrahydroindole.

9. The compound 1-benzyl-5-hydroxymethylene-4-oxo-4,5,6,7-tetrahydroindole.

References Cited by the Examiner

UNITED STATES PATENTS

| | | | |
|---|---|---|---|
| 3,072,530 | 1/1963 | Hofmann et al. | 260—319 X |
| 3,226,398 | 12/1965 | Allen et al. | 260—319 |

ALEX MAZEL, *Primary Examiner.*

MARY U. O'BRIEN, *Assistant Examiner.*

UNITED STATES PATENT OFFICE
CERTIFICATE OF CORRECTION

Patent No. 3,321,486                                                  May 23, 1967

William Alan Remers et al.

It is hereby certified that error appears in the above numbered patent requiring correction and that the said Letters Patent should read as corrected below.

Columns 1 and 2, lines 35 to 45, the upper right-hand formula should appear as shown below instead of as in the patent:

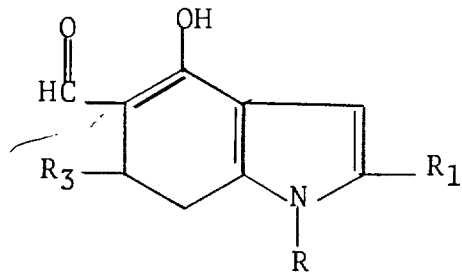

column 4, lines 66 and 67, before the formula insert -- 2.20 --.

Signed and sealed this 28th day of November 1967.

(SEAL)
Attest:

EDWARD M. FLETCHER, JR.                       EDWARD J. BRENNER
Attesting Officer                                 Commissioner of Patents